Figure 2:
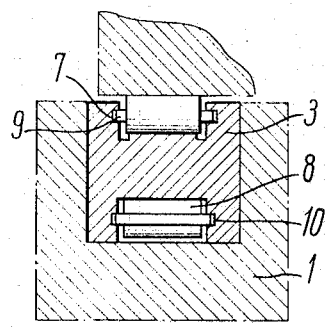

Dec. 12, 1967    V. V. IONOV    3,357,753
ROLLING BEARING FOR MACHINE PARTS OR UNITS
PERFORMING STRAIGHT-LINE MOTION
Filed Oct. 14, 1964

United States Patent Office 3,357,753
Patented Dec. 12, 1967

3,357,753
ROLLING BEARING FOR MACHINE PARTS OR UNITS PERFORMING STRAIGHT-LINE MOTION
Valentin Vasiljevich Ionov, Korobeinikov per. 5/8, Apt. 1, Moscow, U.S.S.R.
Filed Oct. 14, 1964, Ser. No. 403,848
1 Claim. (Cl. 308—6)

This invention relates to rolling contact bearings for machine parts or units performing straight-line motion, and more particularly, to rolling bearings for slides and carriages of broaching, milling, planing and other machine tools and automatic machines.

The invention may also be applied to conveyers and other handling devices which require bearings for straight-line motion of working parts or units characterized by the least possible coefficient of friction.

Rolling contact bearings for working parts or units performing straight line motion are widely known. The conventional bearings in the form of roller chains are disadvantageous in that when arranged horizontally they require a supporting structure to prevent chain slackening and a tensioning device.

Apart from this, the chains are rather heavy and make the size of the bearing cross-section larger.

Also known are oval rolling bearings without separators wherein the rollers roll along guides. However, lack of separating elements results in much sliding friction which makes the maintenance of the rollers a difficult matter and is a cause of their early wear.

Use is also made of ball bearings for straight-moving parts or units wherein the balls roll along guides, and between each adjacent pair of working balls there is interposed a ball smaller in diameter as compared to the working balls.

But the capacity of such bearings is relatively lower than that of the rolling bearings, and, in addition, varying of the distance between the two adjacent working balls because of possible laterally displacement of the small balls, results in dynamic instability and excessive friction during operation.

An object of this invention is to eliminate the above disadvantages and to provide a rolling bearing for straight-line motion which is simple in design and reliable in operation, having a sufficient capacity and allowing to speed up the motion of the working parts or units with the resultant considerable increase in their efficiency.

The problem is solved by using a rolling bearing for straight-line motion, comprising a housing with a race installed therein and working rollers placed in the race-way. According to the invention, mounted between each adjacent pair of working rollers and in contact with them is a needle roller; and journals are provided on the ends of the working rollers, the diameter of said journals being equal to that of the needle rollers. The journals of both the working and needle rollers are inserted in slots arranged along the middle portion of the walls of the race-way.

To facilitate manufacturing and mounting, the housing of the bearing is constituted by a base and two end portions.

The race has separate end portions whose outside sections have semicircular grooves and slots cut therein whereas the inside sections are of a convex shape corresponding to the grooves, and said sections are located in such a manner that when assembled they form a closed profile which is a continuation of the race-way and the guide slots of the race.

It is also expedient that one of the needle rollers be made with journals, so that the diameter of its middle portion is larger than the diameter of the other needle rollers but smaller than the diameter of the working rollers; within this range, a set of interchangeable rollers of various diameters can be provided to replace a roller by a larger one when the bearing becomes worn during service.

Figure 3:
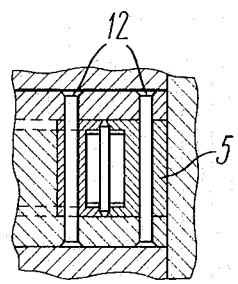
Figures 4, 5:
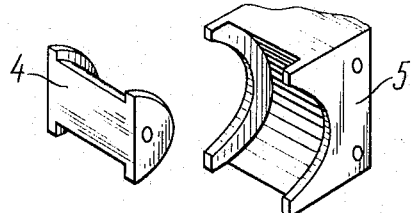
Figure 6:
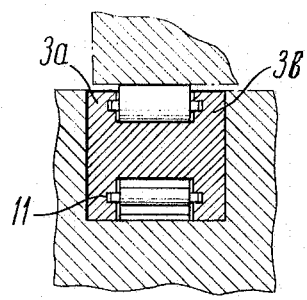
Figure 1:
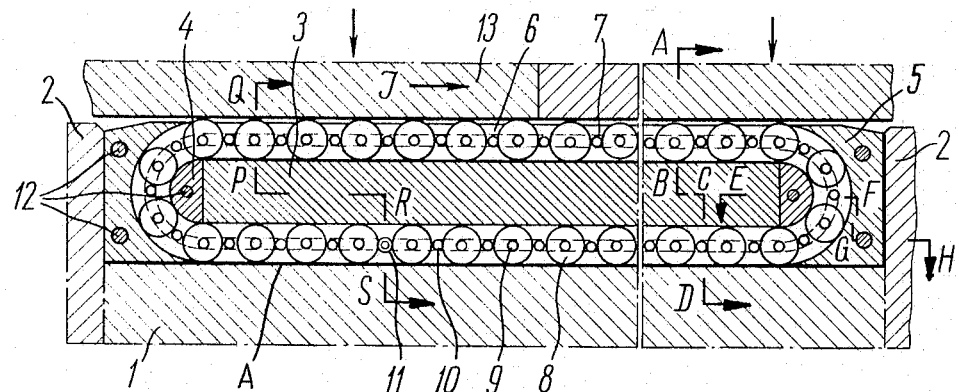

An embodiment of the invention is shown in the drawings, wherein:

FIG. 1 is a side view of a longitudinal section of the bearing which is broken in length,
FIG. 2 is a section along line ABCD (FIG. 1),
FIG. 3 is a section along line EFGH (FIG. 1),
FIG. 4 is a perspective view of the outside end portion of the race,
FIG. 5 is a perspective view of the inside end portion of the race, and
FIG. 6 is a section along line QPRS.

The bearing comprises a housing having a base 1 and end portions 2, and a race 3 with separate end portions 4 and 5.

The race is formed with a race-way 6 and guide slots 7 arranged along a closed path which is straight within the main portion of the race 3 and circular within the race ends 4 and 5.

Mounted in the race-way 6 of race 3 are working rollers 8 with axles or journals 9 entering the guide slots 7 which also receive needle rollers 10 inserted therein in alternation with, and close to, working rollers 8. One of the needle rollers 11 is formed with journals and has a middle portion of larger diameter than rollers 10 but less than the middle portion of the working rollers 8. Thus roller 11 can be replaced by an interchangeable roller having a larger diameter middle portion if the rollers become worn during their long service. The end portions 4 and 5 are fastened to the race 3 with pins 12.

When the slide of the working member 13 moves continuously in the direction of the arrow J along the working rollers 8, the latter roll in the race-way 6 in the top of race 3 and, then pass through the semicircular grooves of the end portions 4 and 5 of the race 3 into said raceway in the bottom of the race 3 where the rollers reverse direction, and continue to move along the closed rolling path.

Due to the presence of the needle rollers 10 between the working rollers 8, slide friction between the rollers is substituted by rolling friction which largely reduces the frictional resistance and provides for speeding up the motion of the working member without losses of power.

What I claim is:

A bearing for transmitting straight line motion, said bearing comprising an elongated race member having a pair of parallel straight race-ways therein, and opposite walls bounding each race-way, said walls having slots therein opening into said race-ways and extending the entire length thereof, said race member having opposite ends and including an insert assembly at each end, said insert assemblies each comprising first and second members secured to the race member and having respective convex and concave surfaces defining a channel which connects and serves as an extension of said race-ways and a groove which connects and serves as an extension of said slots such that a continuous closed path is formed for the raceways and slots, working rollers in said race-ways and channels, said rollers including axles rotatably supported in said slots and grooves, and needle rollers in said race-ways and channels in alternation with the working rollers and in contact therewith, one of said needle rollers being a replaceable compensating roller having a middle portion with a diameter greater than that of the other needle rollers but less than that of the working rollers.

References Cited

UNITED STATES PATENTS

| | | | |
|---|---|---|---|
| 874,837 | 12/1907 | Edwards | 308—206 |
| 992,008 | 5/1911 | Lane | 308—6 X |
| 3,003,828 | 10/1961 | Stark | 308—6 |
| 3,219,398 | 11/1965 | Anderson | 308—6 |
| 3,246,933 | 4/1966 | Better | 308—6 |

FOREIGN PATENTS

| | | |
|---|---|---|
| 1,045,283 | 11/1953 | France. |
| 1,193,830 | 11/1959 | France. |

MARTIN P. SCHWADRON, *Primary Examiner.*

L. L. JOHNSON, *Assistant Examiner.*